Dec. 3, 1957   H. L. MURRAY   2,814,854
MILLING CUTTER
Filed Dec. 6, 1954   2 Sheets-Sheet 1

Howard L. Murray
INVENTOR.

Dec. 3, 1957  H. L. MURRAY  2,814,854
MILLING CUTTER
Filed Dec. 6, 1954  2 Sheets-Sheet 2
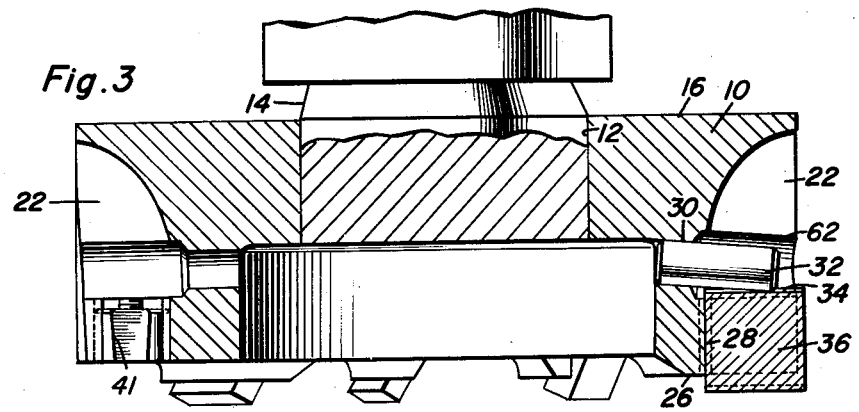
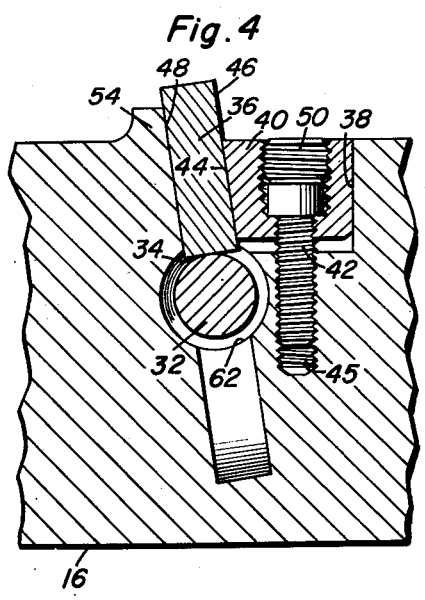
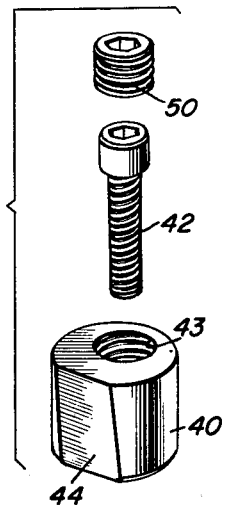
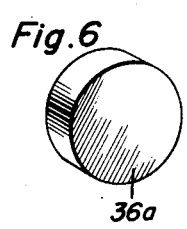
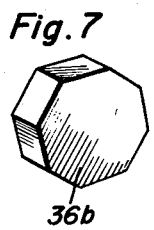
Howard L. Murray
INVENTOR.

United States Patent Office 2,814,854
Patented Dec. 3, 1957

2,814,854

MILLING CUTTER

Howard L. Murray, Detroit, Mich.

Application December 6, 1954, Serial No. 473,254

1 Claim. (Cl. 29—105)

This invention relates in general to machine shop tools, and more particularly to an insert tooth milling cutter.

Heretofore, insert teeth of cutters have been inserted and locked into the body of the cutter and then set up in a grinder and ground on the periphery and on the face. The cutter has then been set up on the machine it is to be used on. If it so happens that one of the blade tips becomes chipped, it is necessary to go through the whole procedure of removing the cutter from the machine, removing the broken tooth and replacing with a new tooth, grinding the one new insert tooth down to coincide with the others already ground, and replace the cutter on the machine. When the teeth become dull from use, this procedure must be followed also. This results in a great number of hours of "down time" of a machine, by wasted time of the operator of that machine and the possible shutting down of an entire production line. Of course, one would think that a duplicate cutter could be kept on hand ready for instant use, but as no two cutters are the same dimensions, the whole set-up would have to be checked and a number of hours lost every time the cutter was replaced.

It is therefore the primary object of this invention to provide a milling cutter having a precision machine body that will readily receive insert teeth or tool bits that may be ground on a surface grinder.

Another object of this invention is to provide a milling cutter that may be left on the machine while replacing a broken or chipped tooth and wherein the replacement tooth will cut exactly as the one replaced.

A further object of this invention is to provide a milling cutter that will have insert teeth ground with no clearance behind the cutting edge, that is, ground at 90°. The angle at which they are inserted in the body will provide both peripheral clearance and face clearance.

A still further object of this invention is to provide a milling cutter that will utilize all eight corners of a square ground tool bit, all sixteen corners of an octagon ground tool bit and an infinite number of cutting edges of circular ground tool bit. In other words, the front and the back of the insert tool bit may be used to equal advantage for cutting because all angles between face and edge of tool bit are ground at 90°.

These together with other objects and advantages which will become subsequently apparent reside in the details of construction and operation of the device as more fully hereinafter described and claimed, reference being had to the accompanying drawings forming a part hereof, wherein like numerals refer to like parts throughout, and in which:

Figure 3 is a side sectional view taken substantially along a plane passing along section line 3—3 of Figure 1;

Figure 4 is a fragmentary sectional view taken substantially along the center line of one of the hold-down screws, showing one of the tool bits, the top pin and the clamping means for the tool bit;

Figure 5 is an exploded group perspective view of the tool bit clamp, hold-down screw and lock screw;

Figure 6 is a perspective view of a circular tool bit; and

Figure 7 is a perspective view of an octagonal tool bit.

Figure 2:
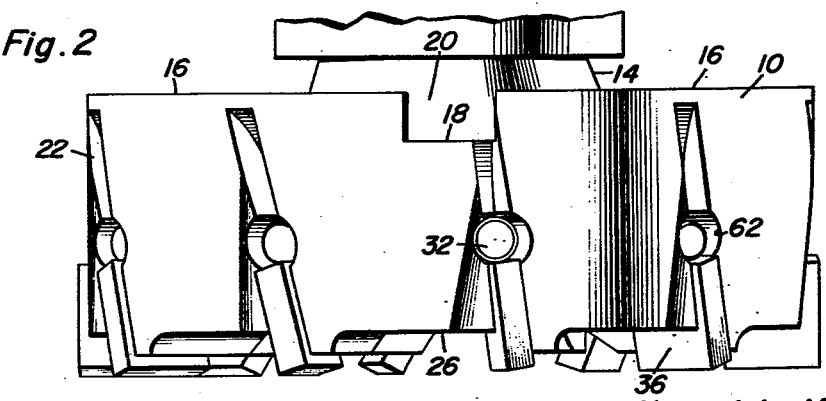
Figure 2 is a side view of the milling cutter.

Referring now to the drawings in detail, it will be seen that there is provided a milling cutter body 10 being of somewhat cylindrical shape which has a hole 12 along the longitudinal axis thereof for suitably receiving an arbor 14 of a milling machine. As is best seen in Figure 2, an upper face 16 of the body 10 has a keyway 18 suitably machined and extending across the diameter of the body 10 to receive a key 20 which is integral with the arbor 14 and thus prevents rotation of the body 10 on the arbor 14 when taking heavy cuts.

Figure 1:
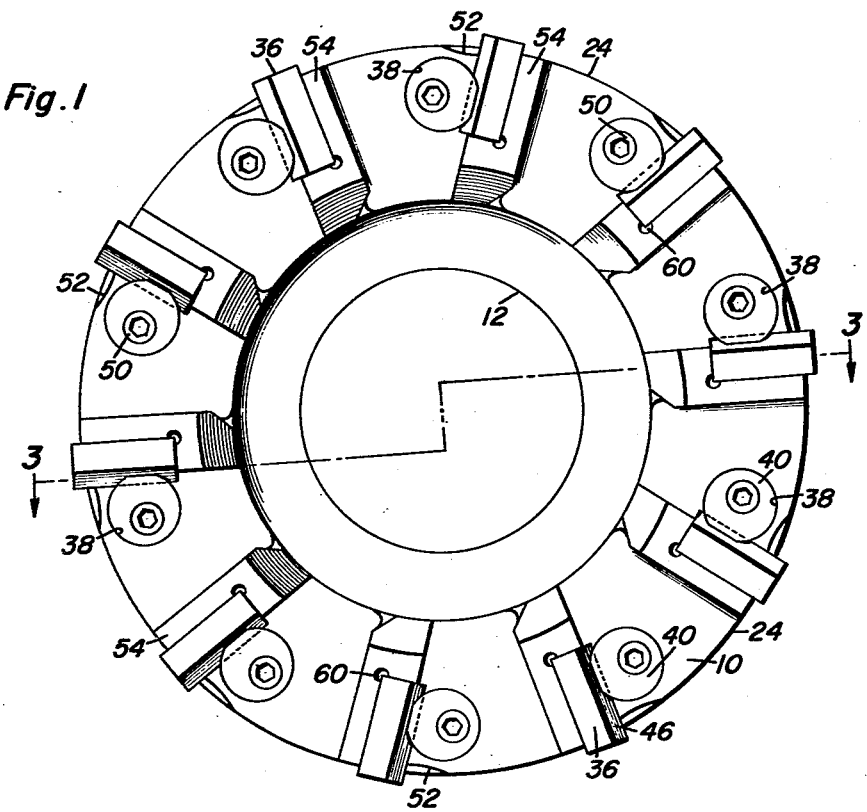
Figure 1 is a face view of the milling cutter mounted on a vertical milling machine and showing all tool bits inserted and ready for use.

The body 10 has a plurality of mutually and equally spaced slots 22 disposed regularly about the periphery thereof. The slots 22 are disposed at an angle to the axis of rotation and extend through an outer peripheral surface 24 and extend through a lower face 26 of the body 10. As is best seen in Figure 1, the slots 22 extend through the face 26 parallel to a radial line of the body 10 which passes rearwardly of the slot 22 and are thus offset in the direction of rotation of the milling cutter. As is best seen in Figure 2, the angle at which the slots 22 are cut into the body 10 advances in the direction of rotation from the face 26 toward the face 16, the purpose of which will be described hereinafter.

As is best seen in Figure 3, each of the slots 22 have an inner face 28 parallel to the longitudinal axis of the cutter and all inner faces 28 of the slots 22 are an equal distance from the center of the cutter. At the upper extremity of face 28 in each of the slots 22 is a hole 30 which extends radially inward and is suitably formed to receive a cylindrical stop pin 32. The pin 32 extends outwardly from the face 28 a sufficient distance to engage an upper face 34 of a tool bit 36 and is press fit in the hole 30. It should be noted that the tool bit 36, although shown as being square in most of the drawings, can be any one of several shapes, such as designated by the numerals 36a and 36b, as illustrated in Figures 6 and 7, respectively, as long as the thickness of the tool bit 36 is held within the limits of the slot 22.

It should be further noted that the pin 32 carried by the hole 30, while extending radially outward, projects into the slot 22 at a slight angle in order to present as a stop for the tool bit 36, one point on the edge of the pin 32 as shown in Figure 3. It is necessary, when manufacturing the cutter body 10, to locate the holes 30 very accurately and to maintain all the holes 30 at exact duplicate angles. By the same token, when the pins 32 are inserted in the holes 30, the distance from the edges of the pins 32 must all be equidistant from the base 26 of the body 10. From the foregoing, it should be apparent that two bits of identical size and shape may be set in the cutter and used without further grinding.

As is best seen in Figure 4, the lower face 26 has adjacent each of the slots 22 a hole 38 parallel to the longitudinal axis of the body 10 and formed to receive a modified cylindrical clamp 40. As best seen in Figure 3 the hole 38 is of such a diameter that it will communicate with the slot 22 and leave an access opening 41 between the hole 38 and the slot 22. The clamp 40 is held in position by a capscrew 42 extending through a threaded aperture 43 in the clamp 40 and threadably received in a threaded bore 45 in the bottom of the hole 38 which causes a wedging action between a beveled or inclined face 44 on the clamp 40 and a side face 46 of the tool bit 36 when tightened, thereby pressing the tool bit against a side face 48 of the slot 22 and holding or clamping the tool bit 36 in position. Adjacent the head of the capscrew 42 is a setscrew 50 which is threadably received in the threaded aperture 43 of the clamp 40, which when tightened, engages the outer end of the capscrew 42 and prevents the loosening of the capscrew 42 accidentally, due to vibration or the like.

Although further explanation should not be necessary, it should be noted that there is provided in the outer peripheral surface 24 in front of the face 46 of each of the tool bits 36 a chip clearance radius 52. Also, an added support 54 is provided behind each of the tool bits 36, which is merely a longitudinal extension of side face 48 of slot 22 and extends radially inwardly on the face 26 for the full width of the tool bit 36. As in most good tool making procedure, there is provided a small clearance hole 60 for the inner edge of the tool bit 36. There is also provided a clearance hole 62 around the pin 32 which extends into the slot 22 and into the face 28.

In operation, the milling cutter is assembled as follows. In each of the slots 22 the procedure is the same. Also, the shape of the tool bit 36 has no effect on the set-up or assembly procedure, and therefore, the insertion of one tool bit will be explained. The clamp 40 being loose, the tool bit 36 is inserted in the slot 22 so that the inner edge when inserted and held inward radially will stop against the inner surface 28 of the slot 22 and the upper edge when inserted will stop against the outer edge of the pin 32. The capscrew 42 is then tightened, thereby forcing the wedge clamp face 44 into engagement with the side face 46 of the tool bit 36 and clamping the tool bit in an immobile position against the side face 48 of the slot 22, the face 28 and the edge of pin 32 serving as locating boundaries for the tool bit 36. The setscrew 50 is then tightened onto the head of the capscrew 42 and the milling cutter is then ready to place on the machine arbor for use.

In use, it should be noted that the slots 22 are cut at an angle to the axis of rotation of the body 10 to provide clearance for the heel of the 90° cutting edge of the tool bit 36 presented to the face of the work surface and carried in the slots 22. The slots 22 are also offset in the direction of rotation of the cutter but parallel to radial lines which pass rearwardly of the slots 22 of the face 26. This expedient provides heel clearance for the 90° cutting edge of the tool bits 36 presented to the edge of a work surface. Thus, the tool bits 36 may be ground on a surface grinder to very close tolerances and to a desired symmetrical shape before insertion in the milling cutter. They may then be inserted in the cutter ready for use without further grinding. The tool bit so formed may also be rotated in slots 22 after becoming dull, thus presenting a new cutting edge to the work surface. They may also be reversed, that is, the heels would be presented to the work surface and become the cutting edge.

Although not heretofore stated, the tool bits 36 are very high grade tool steel, tungsten carbide or the like.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A milling cutter comprising a generally circular cross-sectional body, means for attaching said body to a milling machine arbor, a face of said body perpendicular to the longitudinal axis of said body and opposite the arbor end of said body, a plurality of slots disposed equally about the periphery of said body and extending through said face parallel to and offset in relation to the radial lines of said face, a tool bit removably carried by each of said slots, said tool bits being identical in shape and size and having a plurality of cutting edges presented at the junctures of adjacent faces, and means removably securing said tool bits in said slots whereby any one of the cutting edges of each bit is in cutting position, said slots having inner faces, a cylindrical stop pin extending radially outward from said inner faces into each of said slots, the circumferential outer edges of said pins being equidistant from the respective inner faces of said slots, and said pins extending into said slots at an angle less than 90° to said inner faces whereby said tool bits inserted into said slots will be maintained in identical positions in said slots by face-to-face contact with said inner faces and by one-point contact with the circumferential outer edges of said pins, thus tool bits of varying shapes being utilizable in said slots without alteration thereof, the offset of said slots and said tool bits carried in said slots providing radial clearance of the tool bit heel when rotating against the edge of a work surface, said slots being angularly disposed with relation to the axis of rotation to provide clearance for the heel of the tool bit edge presented to the face of a work surface.

References Cited in the file of this patent
UNITED STATES PATENTS

| | | |
|---|---|---|
| 1,342,055 | Miller | June 1, 1920 |
| 2,128,571 | Miller | Aug. 30, 1938 |
| 2,173,848 | Kraus | Sept. 26, 1939 |
| 2,188,743 | Severson | Jan. 30, 1940 |
| 2,317,262 | Dusevoir | Apr. 20, 1943 |
| 2,367,221 | Kraus | Jan. 16, 1945 |
| 2,501,293 | Sheridan | Mar. 21, 1950 |
| 2,521,035 | Boyle | Sept. 5, 1950 |
| 2,645,003 | Thompson | July 14, 1953 |
| 2,648,893 | Begle | Aug. 18, 1953 |

FOREIGN PATENTS

| | | |
|---|---|---|
| 667,936 | Great Britain | Mar. 12, 1952 |
| 695,778 | Great Britain | Aug. 19, 1953 |